United States Patent [19]
Havens

[11] 4,193,545
[45] Mar. 18, 1980

[54] PRESSURE COMPENSATING EMITTER

[75] Inventor: Glenn G. Havens, La Mesa, Calif.

[73] Assignee: Bayshore Creative Products, Inc., National City, Calif.

[21] Appl. No.: 931,922

[22] Filed: Aug. 7, 1978

[51] Int. Cl.$^2$ .................. B05B 1/30; B05B 15/02
[52] U.S. Cl. .................. 239/109; 138/45; 239/533.1; 239/542; 239/547; 239/570
[58] Field of Search .................. 239/106–109, 239/145, 271, 272, 533.1, 542, 547, 570; 405/36, 39–45, 48; 138/45, 46

[56] References Cited
U.S. PATENT DOCUMENTS

| | | | |
|---|---|---|---|
| 2,781,060 | 2/1957 | Frey | 138/46 |
| 2,802,486 | 8/1957 | Frey | 138/46 |
| 3,977,606 | 8/1976 | Wyss | 239/547 X |
| 4,059,228 | 11/1977 | Werner | 239/542 X |

Primary Examiner—Joseph E. Valenza
Assistant Examiner—Andres Kashnikow
Attorney, Agent, or Firm—Brown & Martin

[57] ABSTRACT

A pressure compensating emitter comprises a generally cylindrical body member having a longitudinal passageway therethrough connecting an inward port and an outward port and a flexible pressure responsive boot mounted within the passageway for responding to increases in pressure within the boot or cup for biasing the walls of the boot into a water flow passageway and restricting the passageway communicating between the inlet and outlet ports in the body of the emitter.

15 Claims, 12 Drawing Figures

PRESSURE COMPENSATING EMITTER

BACKGROUND OF THE INVENTION

The present invention relates to irrigation systems and pertains particularly to a pressure compensating flow control valve for emitters and the like.

Due to the scarcity of water for irrigation purposes in many countries of the world, drip and trickle irrigation systems are becoming widely used. Spray systems are also widely used in many areas and conserve a considerable amount of water over the old fashioned flooding system predominant in many areas.

Drip, trickle and sprinkler systems normally employ a series of conduits carrying water to emitters placed along the length of the conduits for dispensing water at a controlled rate. It is desirable that the system has equal water pressure and flow at each of the emitters. Since it is difficult to obtain equal pressure throughout the system, the system must have some means for compensating for the variations in pressure to achieve a substantially constant flow output from each emitter whether the emitter is spray, drip, or trickle type.

Many systems have been proposed for controlling water flow from emitters. Such systems have met varying degrees of success and have various drawbacks. Some of the more successful systems from the point of functioning and reliability are extremely complicated and expensive and are therefor not feasible for many installations.

It is therefore desirable that some simple, inexpensive and effective flow control means be available for controlling the flow of water in an irrigation system.

SUMMARY AND OBJECTS OF THE INVENTION

Accordingly, it is the primary object of the present invention to overcome the above problems of the prior art.

Another object of the present invention is to provide a simple and inexpensive flow control device for irrigation systems.

A further object of the present invention is to provide a simple and inexpensive and effective flow control emitter for irrigation systems.

In accordance with the primary aspects of the present invention, a flow control device includes a body having a generally cylindrical passageway between inlet and outlet ports and a generally tubular boot disposed in the passageway with a closed end disposed toward the outlet port and means defining a passageway extending along between the wall of the boot and of the inner wall of the housing such that increased pressure within the boot restricts the passageway and thereby controls the flow of water therealong in compensation for pressure within the system.

BRIEF DESCRIPTION OF THE DRAWINGS

The above and other objects and advantages of the present invention will become apparent from the following description when read in conjunction with the drawings, wherein.

DETAILED DESCRIPTION OF A PREFERRED EMBODIMENT

Figure 1:
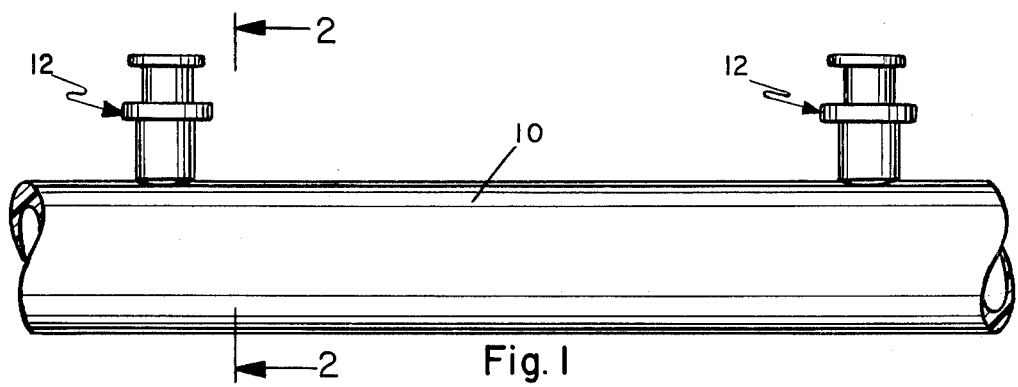
FIG. 1 is a side elevational view of a section of hose with two emitters installed.
Figures 2, 3:
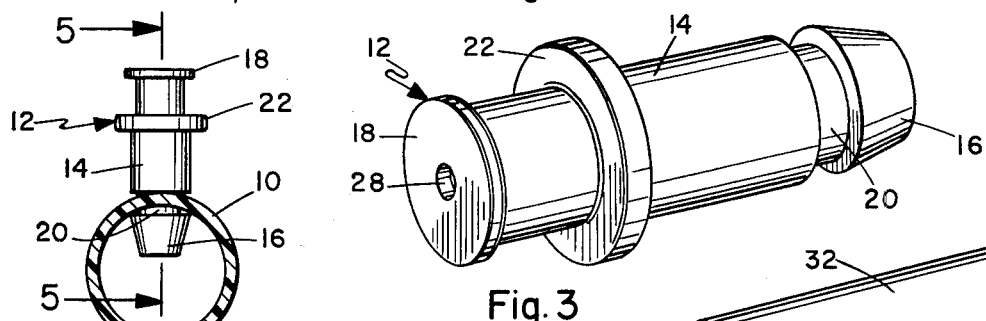
FIG. 2 is a sectional view taken on line 2—2 of FIG. 1.
FIG. 3 is an enlarged perspective view of the emitter body.
Figure 4:
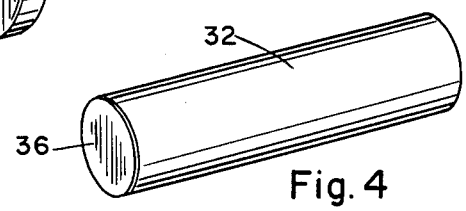
FIG. 4 is a perspective view of the internal cup.

Turning to the drawings, there is shown in FIG. 1 a conduit 10 for conveying water for irrigation purposes and a pair of emitters in accordance with the invention, designated generally by the numeral 12. The conduit may, in a typical application, extend the length of a field and may, for example, be on the order of several hundred feet in length. A plurality of the emitters will be disposed along the length of the tubing for dispensing a controlled amount of water, preferably an equal amount at each emitter.

The emitter comprises an outer housing having a generally cylindrical main body portion 14 and an inlet end defined by a tapered portion 16, and an outlet end 18 of a generally blunt or button like configuration. An annular groove at 20 at the inlet end secures the housing of the emitter in an undersized bore in the tube 10. This end construction having a taper and groove is generally referred to in the industry as a barb. The housing 14 may have any general configuration, however the illustrated embodiment is preferred and includes an annular rib or flange 22 for grasping for assisting in insertion and removal of the emitter from the tubing 10. The body is preferably made of any suitable durable, fairly rigid plastic material which can be formed by injection molding or the like.

Figure 5:
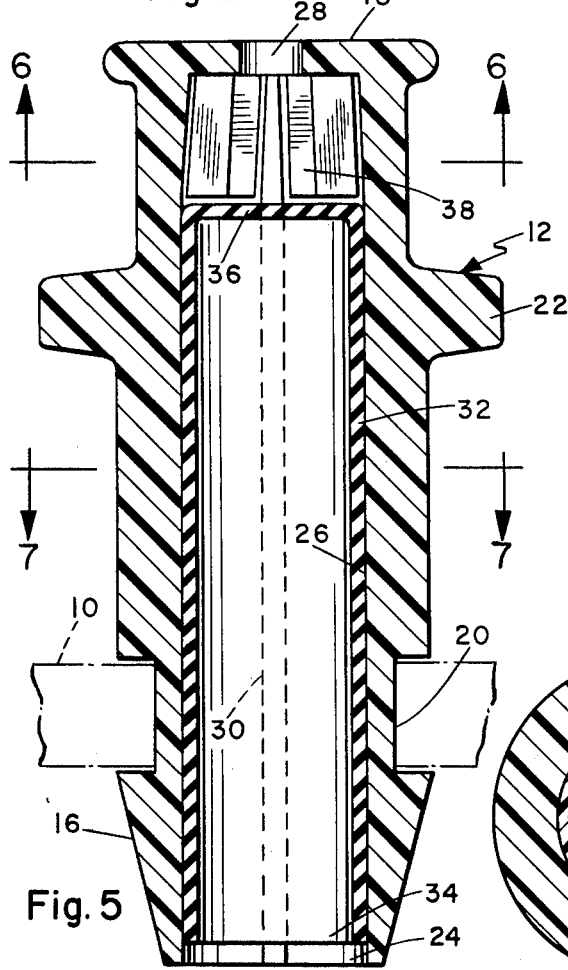
FIG. 5 is an enlarged sectional view taken on line 5—5 of FIG. 2.
Figure 6:
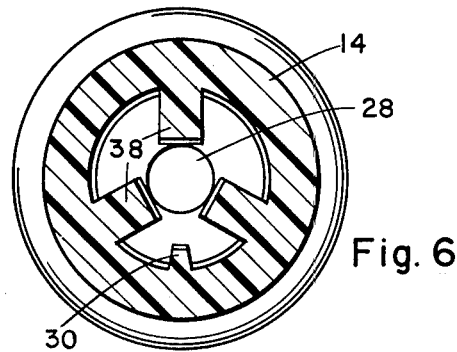
FIG. 6 is a sectional view taken on line 6—6 of FIG. 5.

As best seen in FIG. 5, the body of the preferred embodiment comprises an inlet opening 24 that communicates with a generally cylindrical bore 26 extending substantially the length of the housing and communicating at the opposite end with an outlet port 28. A longitudinal rib 30 extends the length of the bore 26 for maintaining an open flow passage between the walls of the bore 26 and a resilient flexible boot or cup 32 disposed within the bore or passageway 26. The boot 32 has an open forward end 34 disposed at the inlet 24 and a closed upper end 36 at the other end of the housing. A plurality of radially inwardly extending spacing ribs 38 are formed at the outlet end of the bore 26 and extend downward away from the end wall for engaging the end 36 of the boot 32 for maintaining an open passageway between the end of the boot and the outlet port 28. These ribs 38 space the end 36 of the boot from the end 18 of the housing.

Figure 7:
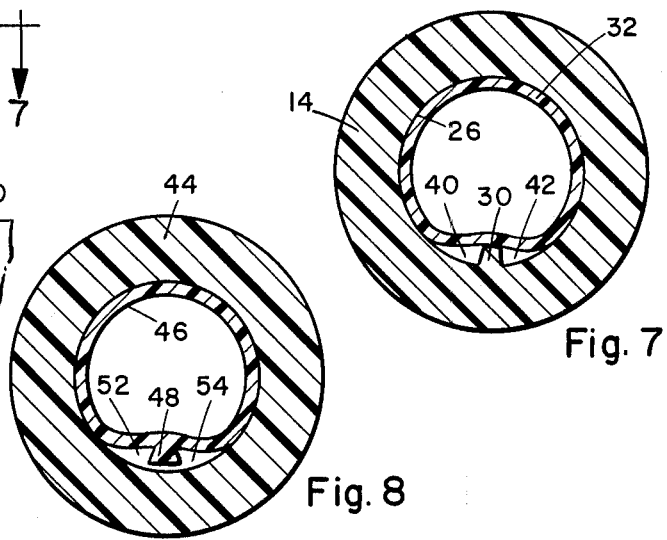
FIG. 7 is a sectional view taken on line 7—7 of FIG. 5.

As best seen in FIG. 7, the boot 32 is spaced away from the wall by means of the rib 30 and defines a pair of passageways 40 and 42 to either side of the rib 30. As will be appreciated, the boot 32 is constructed of a soft, pliable resilient material, and as water pressure increases inside the boot the boot will be forced outward to restrict the passages 40 and 42. As flow velocity increases in the passages 40 and 42, the differential pressure existing across the walls of the boot will cause the boot to be biased outward by the higher pressure inside the boot to further restrict the flow of water along passages 40 and 42.

The boot 32 may be constructed of any suitable flexible, pliable, plastic material, but is preferably constructed of a silicone rubber. Preferably, the material selected has a Shore hardness of approximately 40. Numerous advantages may be associated with the use of the silicone which has not been previously apparent. Silicone is very pliable and has very good dimensional stability. It will operate at up to 500° F. and will not take a permanent set at up to 200° F. Among the other advantages of the use of silicone is that solid particles will not adhere thereto very easily. Also, the silicone is relatively free of a permanent set at high operating temperatures experienced in the desert.

The present invention overcomes two major problems with emitters, namely that of plugging and compensation. The plugging may occur as a result of sediment and the like within the water. Other plugging materials include minerals which may precipitate out of the water. The present invention reduces these problems.

Figure 8:
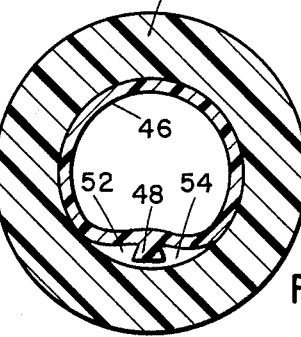
FIG. 8 is a sectional view, similar to FIG. 7, but showing an alternative ribbed cup.

In an alternate embodiment of the invention, as shown in FIG. 8, the housing designated by the numeral 44 is identical to the previous housing with the exception that no rib extends along the wall of the housing itself. In this construction a boot 46 is constructed with a longitudinal rib 48 extending the length of the one side thereof, preferably outside the wall. With this construction, the rib 48 will hold the wall of the boot outward to provide a pair of passageways 52 and 54 extending along the wall. This construction will function substantially the same as the previous embodiment. Minor differences in the performance may be obtained by variation in the thickness of the rib, the wall thickness of the boot, and in the spacing of the rib from the housing wall. Some spacing on the order of 0.010 to 0.015 inches when water pressure is zero is preferable. This provides a self cleaning function that is particularly desirable where salt deposits are a problem.

Other variations in the construction are possible, such as for example, the provision of one or more grooves within the wall of the housing in place of the rib. Likewise, the multiple number of ribs may also be provided, either on the wall of the housing or on the wall of the boot. Such construction techniques may be utilized to obtain variations in performance of the valving system of the emitter, such as spraying, or changing emitter when, for example, trees get larger and require higher units of water.

Figure 9:
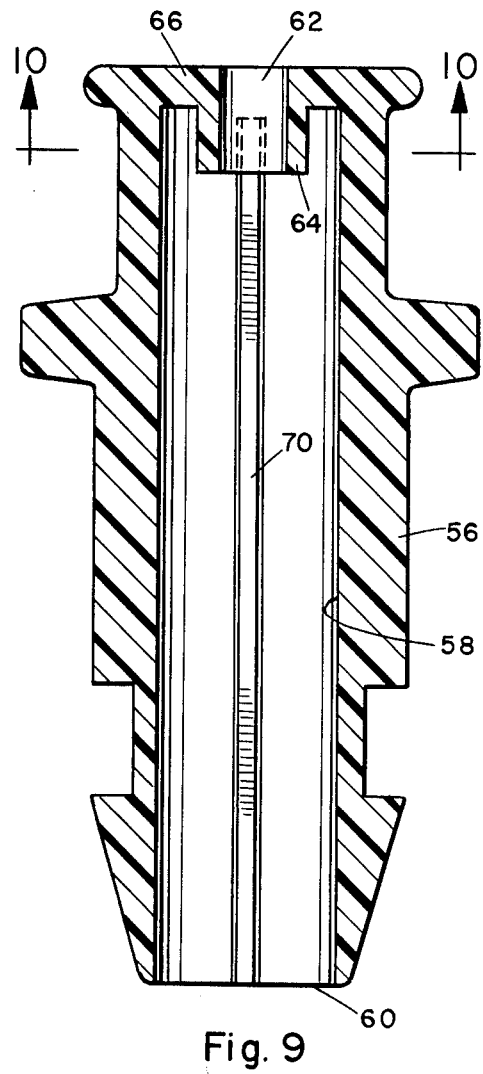
FIG. 9 is a sectional view similar to FIG. 5, showing an alternative outlet and rib configuration.
Figure 10:
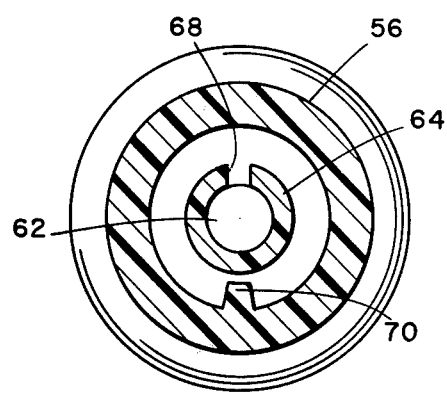
FIG. 10 is a sectional view taken on line 10—10 of FIG. 9.

A further embodiment of the invention is illustrated in FIGS. 9 and 10, wherein a housing 56 includes a bore 58 with an inlet at 60 and an outlet at 62. In this embodiment, the spacer at the outlet comprises a generally C-shaped wall portion 64 extending inward from the end wall 66. This C-shaped wall defines a slit opening 68 in the wall thereof communicating between the annular space between the wall 64 and bore 58, and the outlet port 62. The resilient boot or cup that controls flow will be the same as in the previous embodiment.

A rib 70 extends the length of bore 58 for holding the wall of the boot away from the wall of housing 56, to provide a passageway for fluid flow between the inlet 60 and outlet 62. This rib is preferably positioned on the opposite side of the axis of the bore from the opening 68 in wall 64. This rib, as in the previous embodiments, can be formed on the boot or on the wall of the housing. This arrangement is particularly desirable where precipitation of salts such as $CaCO_3$, $MgSO_4$ and others, is a problem. This arrangement reduces the chance of water droplets forming on the rib and drying out to form deposits when the system is shut down. Where the rib is on the boot, the movement of the boot tends to break up any deposits that form thereon so that it can be flushed from the system.

Figure 11:
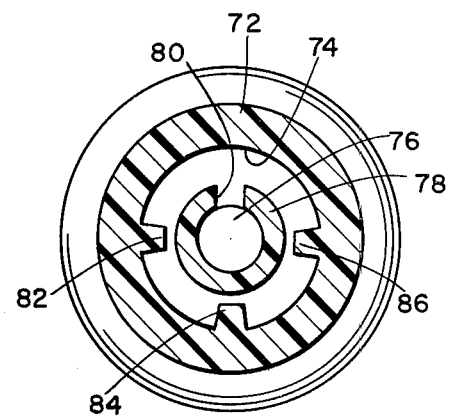
FIG. 11 is a sectional view similar to FIG. 10, showing a multiple rib arrangement.

The above described system is usually designed as a dripper system with a very low flow rate of about one to one and a half gallons per hour. The system can be made a spray (i.e. sprinkler) system by increasing the flow of water to the outlet of the emitter. This can be done by increasing the number of ribs extending along the side wall of the boot and bore as shown in FIG. 11. In this embodiment, a housing 72 includes a bore 74 communicating with an outlet 76. A C-shaped spacer wall 78 spaces the end of the boot from the outlet and permits flow through slot 80. A plurality of ribs 82, 84 and 86 extend along the wall of the bore 74 of housing 72. These ribs each provide passages between the inlet and outlet of the emitter housing increasing the flow through the emitter to the outlet thereof to about four (4) to five (5) gallons per hour. This increased flow comes out the outlet 76 as a spray.

Figure 12:
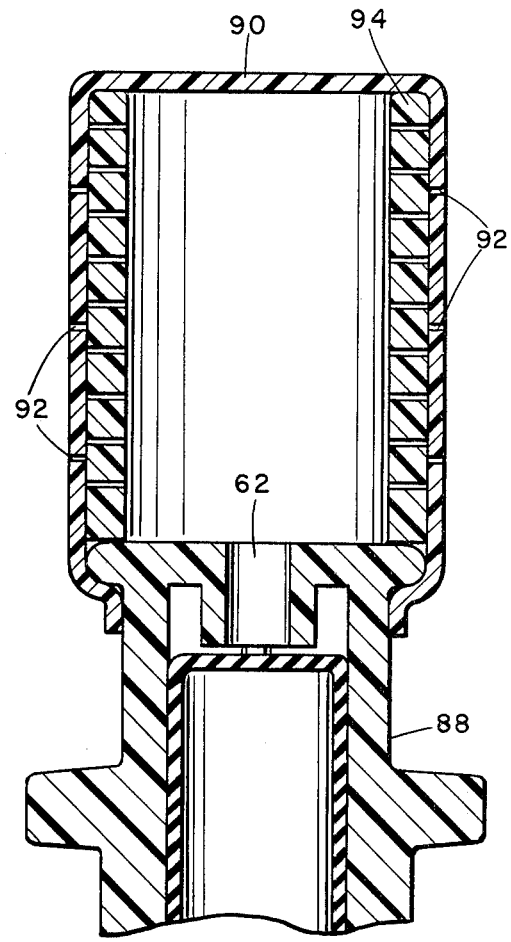
FIG. 12 is similar to a portion of FIG. 9, with a sprayer cap attached.

An alternate arrangement for obtaining a spray is shown in FIG. 12. In this embodiment a standard emitter 88 with a single rib is provided with a resilient cap 90 sealingly fitted over the button shaped top thereof. The resilient cap is preferably constructed of silicone rubber and includes a plurality of microscopic pin holes 92 therein. These holes are formed such as by means of a pin and will stay closed until pressure within the cap reaches about four (4) psi. This increased pressure opens the holes 92 so that a stream or spray of water is emitted therefrom even at low flow rates of about one (1) to one and a half ($1\frac{1}{2}$) gallons per hour. If the emitter is to be used primarily as a sprayer in a particular installation, the cap 90 can be supported by an internal rigid sleeve 94 of porous or perforated material. This sleeve holds the cap in partially stretched position with holes 92 slightly open, to provide a spraying action at very low pressure.

The present valve may also be used simply as a flow control valve between a main supply line and one or more additional lines. Thus the primary aspect of the invention is that it provides a simple, rigged, effective and inexpensive flow control valve for controlling the flow of small quantities of water between inlet and outlet ports of the valve housing.

While the present invention has been illustrated and described by means of specific embodiments, it is to be understood that numerous changes and modifications may be made therein without departing from the spirit and scope of the invention as defined in the appended claims.

Having described my invention, I now claim:

1. A pressure compensating emitter for irrigation systems comprising:
   a generally cylindrical body member having a longitudinal bore defining a passageway therethrough with an inlet port at one end of the body for mounting in a conduction line and an end wall including means defining an outlet port in the wall at the other end of the body for distributing a controlled flow of water therefrom, spacing rib means extending inward from said end wall along the bore, a flexible imperforate substantially cylindrical boot having an outer diameter substantially equal to that of said longitudinal bore mounted in said passageway and having an open end at said inlet port end of said body and a closed end at the outlet port end of said body in engagement with and supported away from said end wall by said spacing rib means, and elongated rib means extending along said passageway between the walls of said boot and said bore for biasing and supporting the wall of said boot adjacent said rib away from the wall of said bore for maintaining a flow path between said inlet port and said outlet port.

2. The pressure compensating emitter of claim 1, wherein said elongated rib means is formed on the inside of the wall of said passageway.

3. The pressure compensating emitter of claim 2, wherein said body is constructed of a thermosetting plastic, and said boot is constructed of a silicone rubber.

4. The pressure compensating emitter of claim 1, wherein said elongated rib means is formed on the outside of the wall of said boot.

5. The pressure compensating emitter of claim 4, wherein said boot is constructed of a silicone rubber.

6. The pressure compensating emitter of claim 1, wherein said body is constructed of a thermosetting plastic, and said boot is constructed of a silicone rubber.

7. The pressure compensating emitter of claim 6, wherein said boot is constructed of a silicone rubber having a wall thickness of about 0.17 thousandths of an inch and a Shore hardness of approximately 40.

8. The pressure compensating emitter of claim 1, wherein said boot is constructed of a silicone rubber having a wall thickness of about 0.17 thousandths of an inch and a Shore hardness of approximately 40.

9. A pressure compensating emitter for irrigation systems comprising:

a generally cylindrical thermoplastic body member having a longitudinal bore defining a passageway therethrough with an inlet port at one end of the body for mounting in a conduction line and an end wall with an outlet port at the other end of the body for distributing a controlled flow of water therefrom, a flexible imperforate substantially cylindrical silicone rubber boot having a wall of thickness of about 17 thousandths of an inch and a shore hardness of approximately 40 mounted in said passageway and having an open end at said inlet port end of said body and a closed end at the outlet port end of said body, spacing rib means of a generally C-shape partially surrounding the outlet port and spaced from the inner walls of the housing, defining a substantially annular space therebetween with a slot communicating between said annular space and said outlet port for maintaining an open fluid flow path between said passageway and said outlet port, and elongated rib means extending along said passageway between the walls of said boot and said bore for maintaining a flow path between said inlet port and said outlet port.

10. The pressure compensating emitter of claim 9, wherein said elongated rib means is spaced circumferentially around the wall of said bore from said slot.

11. The pressure compensating emitter of claim 10, wherein said elongated rib means is on the opposite side of the axis of said bore from said slot.

12. The pressure compensating emitter of claim 9, wherein said elongated rib means comprises a plurality of ribs extending along said bore.

13. The pressure compensating emitter of claim 9, including a resilient perforated cap covering said outlet port.

14. The pressure compensating emitter of claim 13, wherein said cap is constructed of silicone rubber.

15. The pressure compensating emitter of claim 14, and including a substantially rigid porous sleeve inside and supporting said resilient cap.

* * * * *